United States Patent
Lee et al.

(10) Patent No.: US 8,048,334 B2
(45) Date of Patent: Nov. 1, 2011

(54) DISPLAY PANEL

(75) Inventors: Jung-Hun Lee, Seoul (KR); Seon-Ah Cho, Busan (KR); Jeong-Uk Heo, Seongnam-si (KR); Seong-Nam Lee, Seoul (KR); Byoung-Sun Na, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 181 days.

(21) Appl. No.: 12/503,157

(22) Filed: Jul. 15, 2009

(65) Prior Publication Data

US 2010/0149478 A1 Jun. 17, 2010

(51) Int. Cl.
C09K 19/52 (2006.01)
C09K 19/00 (2006.01)
G09G 3/36 (2006.01)
G02F 1/13 (2006.01)
G02F 1/1333 (2006.01)

(52) U.S. Cl. .............. 252/299.01; 252/299.6; 430/20; 428/1.1; 345/87; 349/1; 349/56; 349/182

(58) Field of Classification Search ............... 349/144, 349/182–187, 1, 56; 252/299.01, 299.6; 428/1.1; 430/20; 345/87
See application file for complete search history.

(56) References Cited

U.S. PATENT DOCUMENTS

| 2008/0002123 A1* | 1/2008 | Kim ............................ 349/139 |
| 2009/0027609 A1* | 1/2009 | Kim et al. ................... 349/158 |
| 2010/0231845 A1* | 9/2010 | Seong et al. ................ 349/183 |

* cited by examiner

*Primary Examiner* — Geraldina Visconti
(74) *Attorney, Agent, or Firm* — Cantor Colburn LLP (57) ABSTRACT

A display panel includes a first substrate, a second substrate, and a liquid crystal layer. The first substrate includes a switching element connected to a gate line and a data line crossing each other, and a pixel electrode electrically connected to the switching element. The pixel electrode includes a first domain-dividing portion extending in a direction. The second substrate is spaced apart from the first substrate to have a cell gap of about 3.1 μm to about 3.3 μm. The second substrate includes a common electrode including a second domain dividing portion formed in a region between the first domain-dividing portions adjacent to each other. The liquid crystal layer is interposed between the first and second substrates. The liquid crystal layer includes a liquid crystal composition having a refractive anisotropy (Δn) of about 0.1010 to about 0.1030.

20 Claims, 5 Drawing Sheets

DISPLAY PANEL

This application claims priority to Korean Patent application No. 2008-126301, filed on Dec. 12, 2008, and all the benefits accruing therefrom under 35 U.S.C. §119, the contents of which in its entirety are herein incorporated by reference.

BACKGROUND OF THE INVENTION

1. Field of the Invention

The present invention relates to a display panel. More particularly, the present invention relates to a display panel used in a liquid crystal display ("LCD") device.

2. Description of the Related Art

Generally, a liquid crystal display ("LCD") device includes an LCD panel for displaying an image and a backlight assembly for providing the LCD panel with light. The LCD panel includes a thin-film transistor ("TFT") substrate having a switching element to drive a pixel, an opposing substrate facing the TFT substrate, and a liquid crystal layer interposed between the TFT substrate and the opposing substrate. An image is displayed on the LCD panel depending upon the light transmittance of the liquid crystal material, which changes according to the voltages applied to the pixel.

Operation modes of the LCD device for displaying an image are classified according to the directional arrangement of liquid crystal molecules. Examples of the operation modes may include a twisted nematic ("TN") mode, an in-plane switching ("IPS") mode, a vertical alignment ("VA") mode, and the like.

The VA mode may include a patterned vertical alignment ("PVA") mode dividing a pixel into multiple domains in order to facilitate a wide viewing angle. In the PVA mode, a pixel electrode includes a first opening portion, and a common electrode includes a second opening portion not coinciding with the first opening portion, to thereby change the direction of a fringe field between the pixel electrode and the common electrode. The arrangement of the liquid crystal molecules is changed by the direction of the fringe field, so that the liquid crystal molecules are divided into the multiple domains.

However, when an LCD device operating in the PVA mode includes the first and second opening portions, the aperture ratio of the PVA mode may be lower than that of the VA mode. The aperture ratio is generally proportional to a light transmittance ratio, and thus the light transmittance ratio of the PVA mode is lower than that of the VA mode. Thus, when an LCD device is operated in the PVA mode, the display quality may be reduced despite the wide viewing angle.

BRIEF SUMMARY OF THE INVENTION

Exemplary embodiments of the present invention provide a display panel capable of improving the aperture ratio and the light transmittance.

According to one aspect of the present invention, a display panel includes a first substrate, a second substrate, and a liquid crystal layer. The first substrate includes a switching element connected to a gate line and a data line; the gate line and the data line crossing each other. The first substrate also includes a pixel electrode electrically connected to the switching element. The pixel electrode includes a first domain-dividing portion extending in a direction. The second substrate is spaced apart from the first substrate to have a cell gap of about 3.1 micrometers ("μm") to about 3.3 μm. The second substrate includes a common electrode including a second domain-dividing portion formed in a region between the first domain-dividing portions adjacent to each other. The liquid crystal layer is interposed between the first and second substrates. The liquid crystal layer includes a liquid crystal composition having a refractive anisotropy (Δn) of about 0.1010 to about 0.1030.

At least one of the first and second domain-dividing portions may have a width of about 7.0 μm to about 9.0 μm.

In an embodiment, the pixel electrode may include a first sub-electrode receiving a first voltage and a second sub-electrode receiving a second voltage; the second voltage being different from the first voltage. The second sub-electrode may be spaced apart from the first sub-electrode and include the first domain-dividing portion. The switching element may include a first transistor electrically connected to the first sub-electrode and a second transistor electrically connected to the second sub-electrode.

A gap between the first and second sub-electrodes may be about 4.5 μm to about 6.5 μm.

In an embodiment, the second domain-dividing portion corresponding to the first sub-electrode may have a width of about 8 μm to about 10 μm, and the second domain-dividing portion corresponding to the second sub-electrode may have a width of about 7 μm to about 8 μm.

A dielectric anisotropy (Δ∈) of the liquid crystal composition may be about −3.4 farads per meter ("F/m") to about −2.9 F/m.

According to one aspect of the present invention, a display panel includes a first substrate, a second substrate, and a liquid crystal layer. The first substrate includes a switching element connected a gate line and a data line; the gate and the data line crossing each other. The first substrate also includes a pixel electrode that is electrically connected to the switching element. The pixel electrode includes a first domain-dividing portion having a width of about 7.0 μm to about 9.0 μm, the first domain-dividing portion extending in a slanted direction with respect to the gate line. The second substrate is spaced apart from the first substrate to have a cell gap of about 3.1 μm to about 3.3 μm. The second substrate includes a common electrode including a second domain dividing portion formed in a region between the first domain-dividing portions adjacent each other. The liquid crystal layer is interposed between the first and second substrates.

In an embodiment, the pixel electrode may include a first sub-electrode receiving a first voltage and a second sub-electrode receiving a second voltage; the second voltage being different from the first voltage. The second sub-electrode may be spaced apart from the first sub-electrode and include the first domain-dividing portion. The switching element may include a first transistor electrically connected to the first sub-electrode and a second transistor electrically connected to the second sub-electrode.

A gap between the first and second sub-electrodes may be about 4.5 μm to about 6.5 μm.

In an embodiment, the second domain-dividing portion corresponding to the first sub-electrode may have a width of about 8 μm to about 10 μm, and the second domain-dividing portion corresponding to the second sub-electrode may have a width of about 7 μm to about 8 μm.

According to the present invention, an aperture ratio and the light transmittance of a display panel having a low cell gap may be improved. In addition, texture defects may be prevented. Thus, the display quality of a display panel may be improved.

BRIEF DESCRIPTION OF THE DRAWINGS

The above and other aspects, advantages, and features of the invention will become more apparent by describing in further detail exemplary embodiments thereof with reference to the attached drawings, in which.

DETAILED DESCRIPTION OF THE INVENTION

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular an embodiment only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-sectional illustrations that are schematic illustrations of idealized embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
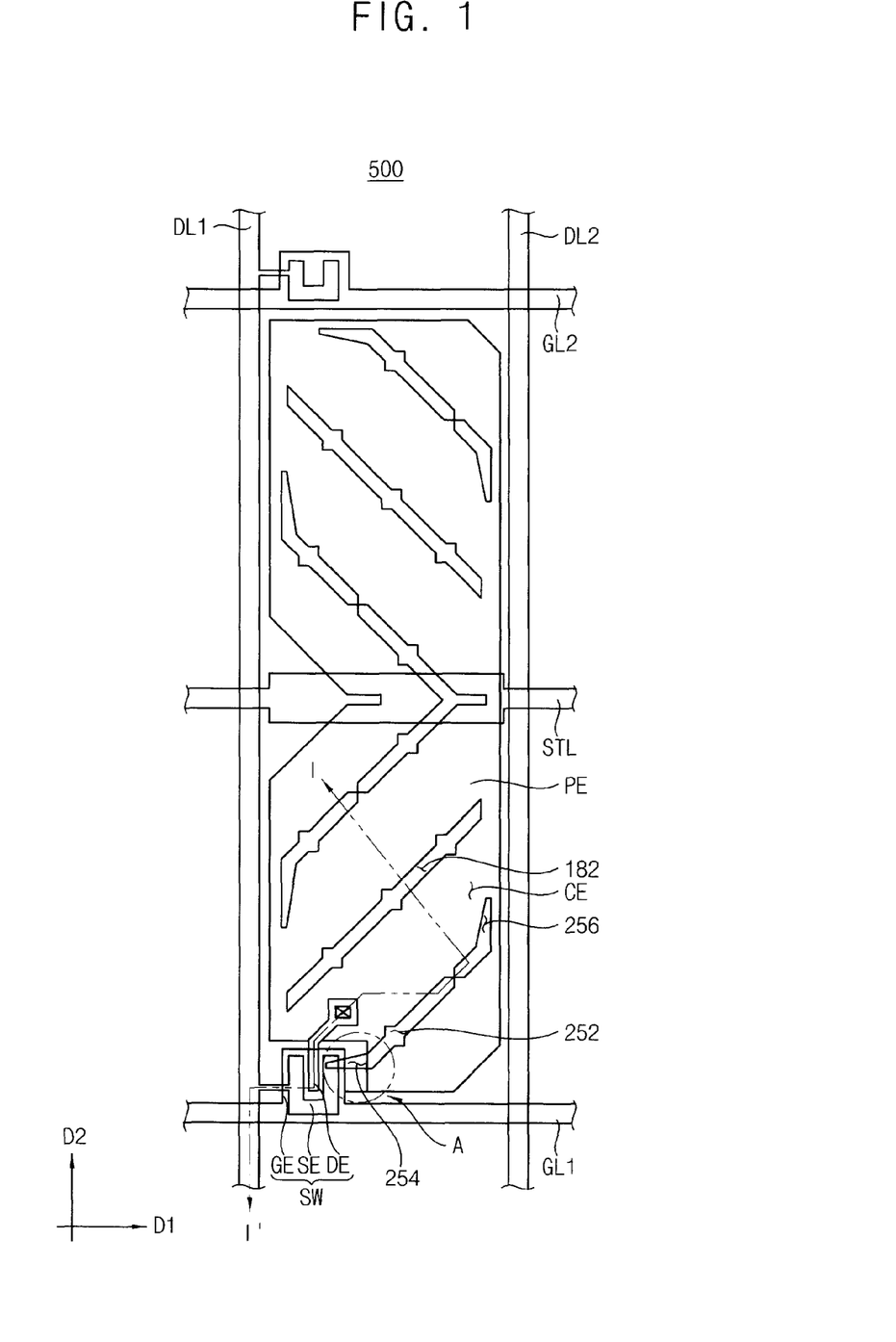
FIG. 1 is an exemplary plan view illustrating a display panel according to the present invention.
Figure 2:
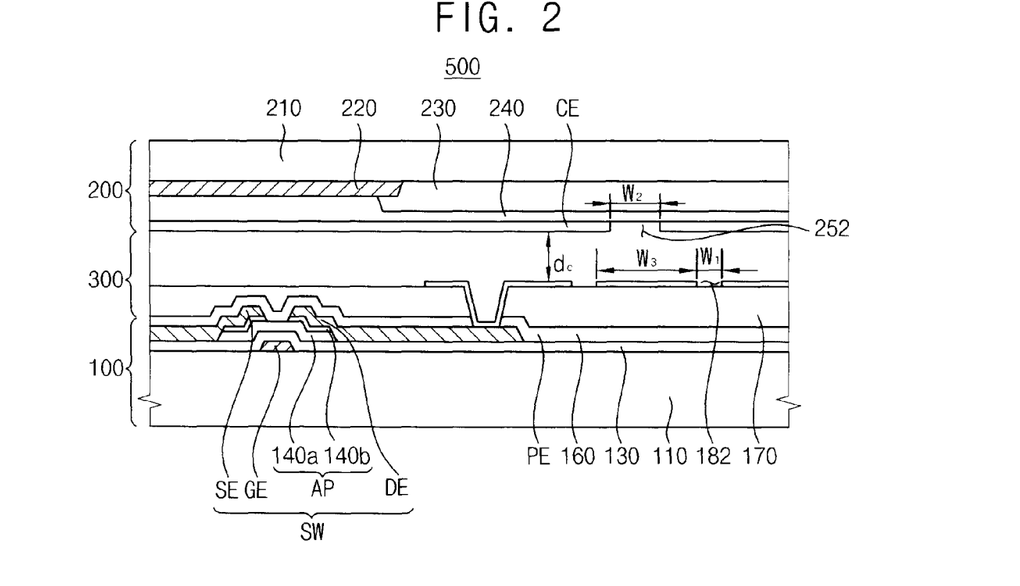
FIG. 2 is an exemplary cross-sectional view taken along a line I-I' in FIG. 1.

FIG. 1 is an exemplary plan view illustrating a display panel according to the present invention. FIG. 2 is an exemplary cross-sectional view taken along a line I-I' in FIG. 1.

Referring to FIGS. 1 and 2, a display panel 500 includes a first substrate 100, a second substrate 200, and a liquid crystal layer 300. In one embodiment, the liquid crystal layer 300 is disposed between the first substrate 100 and the second substrate 200.

The first substrate 100 may be a lower substrate of the display panel 500. The first substrate 100 includes a plurality of signal lines, a thin-film transistor ("TFT") SW as a switching element connected to the signal lines, a pixel electrode PE connected to the TFT SW, and a storage line STL which are formed on a first base substrate 110. In addition, the first substrate 100 may further include a gate insulation layer 130, a passivation layer 160, and an organic layer 170 which are formed on the first base substrate 110.

The signal lines include a plurality of gate lines GL1 and GL2 receiving a gate signal and a plurality of data lines DL1 and DL2 receiving a data signal. The gate lines GL1 and GL2 may extend in a first direction D1 of the display panel 500. The gate lines GL1 and GL2 may be substantially arranged in parallel with each other in a second direction D2; the second direction D2 being different from the first direction D1. In one embodiment, the second direction D2 may be substantially perpendicular to the first direction D1. For example, a first gate line GL1 of the gate lines GL1 and GL2 may be substantially parallel to one another and extend in the first direction D1. The data lines DL1 and DL2 may extend in the second direction D2. The data lines DL1 and DL2 may be substantially arranged in parallel with each other in the first direction D1.

The first and second gate lines GL1 and GL2 cross the first and second data lines DL1 and DL2 to form a pixel unit. The pixel unit may include the TFT SW, the pixel electrode PE, and a storage capacitor Cst.

The TFT SW may be connected to the first gate line GL1 and the first data line DL1. The TFT SW includes a gate electrode GE, a source electrode SE, a drain electrode DE, and an active pattern AP. The gate electrode GE is connected to the first gate line GL1 and formed on the first base substrate 110. The source electrode SE is connected to the first data line DL1 and formed on the gate electrode GE. The source electrode SE is overlapped with an edge portion of the gate electrode GE. The drain electrode DE is spaced apart from the source electrode SE and overlapped with an opposite edge portion of the gate electrode GE. The active pattern AP is formed on the gate electrode GE to be disposed between the gate electrode GE and the source electrode SE as well as between the gate electrode GE and the drain electrode DE. The active pattern AP may include a semiconductor layer 140a and an ohmic contact layer 140b. For example, the semiconductor layer 140a may include amorphous silicon, and the ohmic contact layer 140b may include amorphous silicon doped with n-type dopants at a high concentration.

The storage line STL is substantially disposed in parallel with the first and second gate lines GL1 and GL2. The storage line STL crosses the first and second data lines DL1 and DL2. The storage line STL is disposed between the first and second gate lines GL1 and GL2. The storage line STL overlaps with the pixel electrode PE. The storage line STL may serve as a first electrode of the storage capacitor Cst, and the pixel electrode PE may serve as a second electrode of the storage capacitor Cst. Electrons provided to the pixel unit may be charged in the gate insulation layer 130 and the passivation layer 160 disposed between the storage line STL and the pixel electrode PE.

The gate insulation layer 130 may be formed on a gate pattern including the gate electrode GE, the first and second gate lines GL1 and GL2 and the storage line STL. The active pattern AP may be formed on the gate insulation layer 130 including the gate pattern. Examples of a material that may be used for the gate insulation layer 130 may include silicon nitride, silicon oxide, and the like.

The passivation layer 160 may be formed on a source pattern including the source electrode SE, the drain electrode DE, the first and second data lines DL1 and DL2. Examples of a material that may be used for the passivation layer 160 may include silicon nitride, silicon oxide, and the like.

The organic layer 170 may be formed on the passivation layer 160. The organic layer 170 may have a hole corresponding to the storage line STL. The hole may be formed by removing a portion of the organic layer 170 corresponding to the storage line 170. The electric capacitance of the storage capacitor Cst may be adjusted by the height of the hole. The organic layer 170 may protect the TFT SW and may planarize the first substrate 100.

The passivation layer 160 and the organic layer 170 may have a contact hole exposing a portion of the drain electrode DE.

The pixel electrode PE is electrically connected to the TFT SW. The pixel electrode PE may be formed in a region of the first base substrate 110, which is defined by the first and second gate lines GL1 and GL2 and the first and second data lines DL1 and DL2. The pixel electrode PE may make contact with the drain electrode DE through the contact hole CNT to electrically connect the TFT SW. The pixel electrode PE may be formed using an optically transparent material having electrical conductivity. Examples of a material that may be used for the pixel electrode PE may include indium tin oxide ("ITO"), indium zinc oxide ("IZO"), and the like.

The pixel electrode PE includes a first domain-dividing portion 182 dividing a plurality of liquid crystal molecules into multiple domains. The first domain-dividing portion 182 with a second domain-dividing portion 252 of a common electrode layer CE may divide the liquid crystal molecules into the multiple domains. For example, the first domain-dividing portion 182 may be an opening, and may be formed by removing a portion of the pixel electrode PE. The first domain-dividing portion 182 has a first width ($w_1$). The first domain-dividing portion 182 may extend in a slanted direction with respect to the first gate line GL1. The first width ($w_1$) may be of about 7.0 µm to about 9.0 µm. In an embodiment, the first width ($w_1$) may be about 8.0 µm. The first domain-dividing portion 182 may extend in a first intermediate direction between the first and second directions D1 and D2 in regions between the first gate line GL1 and the storage line STL. The first domain-dividing portion 182 may extend in a second intermediate direction different from the first intermediate direction in regions between the second gate line GL2 and the storage line STL. The second intermediate direction may be substantially perpendicular to the first intermediate direction. For example, the first domain-dividing portion 182 may have a V-shape, W-shape, and the like. The first domain-dividing portion may include a plurality of notches controlling the multiple domains of the liquid crystal molecules.

Although not shown in figures, the first substrate 100 may include a first alignment layer formed on the pixel electrode PE.

As can be seen in the FIG. 2, the second substrate 200 is spaced apart from the first substrate 100 to have a predetermined cell gap ($d_c$). The cell gap ($d_c$) is the distance between the first substrate 100 and the second substrate 200. In particular, the cell gap ($d_c$) may be defined by a distance between the pixel electrode PE and the common electrode layer CE. The cell gap ($d_c$) may be of about 3.1 µm to about 3.3 µm. In an embodiment, the cell gap ($d_c$) may be about 3.2 µm. When the same voltages are provided to a display panel having a cell gap ($d_c$) of about 3.2 µm and a display panel having a cell gap ($d_c$) of about 3.5 µm, the strength of the fringe field of the display panel having a cell gap ($d_c$) of about 3.2 µm is stronger than that of the display panel having the cell gap ($d_c$) of about 3.5 µm. Thus, the movement range of the liquid crystal molecules in the display panel having a cell gap ($d_c$) of about 3.2 µm is larger than that the liquid crystal molecules in a display panel having the cell gap ($d_c$) of about 3.5 µm, when the display panels receive the same voltage. According to the present invention, the cell gap ($d_c$) is decreased to about 3.1 µm to about 3.3 µm, and thus the liquid crystal molecules may be controlled by a lower voltage when compared with the voltage required to control the liquid crystal molecules in the display panel having the cell gap ($d_c$) of about 3.5 µm.

The second substrate 200 includes a light-blocking pattern 220, a color filter 230, an overcoating layer 240, and the common electrode layer CE all of which are formed on a second base substrate 210.

The light-blocking pattern 220 may be formed on the second base substrate 210 corresponding to the first and second gate lines GL1 and GL2, the first and second data lines DL1 and DL2. The light-blocking pattern 220 may be formed using a metal or an organic material.

The color filter 230 may be formed on each of the regions divided by the light-blocking pattern 220 of the second base substrate 210. The color filter 230 may have a red color, green color, or blue color. The color filter 230 may be formed using a photosensitive organic material or a color ink.

The overcoating layer 240 may be formed on the second base substrate 210 including the light-blocking pattern 220 and the color filter 230. The overcoating layer 240 may planarize the second substrate 200 and prevent impurities from flowing into the common electrode layer CE. For example, the overcoating layer 240 may be formed using an acrylic resin. The overcoating layer 240 is optional and may be omitted if desired.

The common electrode layer CE may be formed on the overcoating layer 240. The common electrode layer CE faces the pixel electrode PE. The common electrode layer CE in conjunction with the pixel electrode PE forms a fringe field in the liquid crystal layer 300. The common electrode layer CE may be formed using a transparent material having conductivity. Examples of the transparent material may include ITO, IZO, and the like.

The common electrode layer CE may include the second domain-dividing portion 252. In addition, the common electrode layer CE may further include a first wing portion 254 and a second wing portion 256, which are connected to the second domain-dividing portion 252 and formed at each of the edge portions of the second domain-dividing portions 252. The second domain-dividing portion 252 may be disposed so as to not overlap the first domain-dividing portion 182. In particular, the second domain-dividing portion 252 may be formed in a region of the second base substrate 210 corresponding to a region between the first domain-dividing portions 182 adjacent to each other. The second domain-dividing portion 252 may be an opening, and may be formed by removing a portion of the common electrode layer CE. The second domain-dividing portion 252 has a second width ($w_2$). The second domain-dividing portion 252 may extend in a slanted direction with respect to the first gate line GL1. In the plan view, the second domain-dividing portion 252 may be substantially arranged in parallel with the first domain-dividing portion 182. The second width ($w_2$) may be about 7 μm to about 9 μm. In an embodiment, the second width ($w_2$) may be about 8 μm. The second domain-dividing portion 252 may extend in the first intermediate direction in regions between the first gate line GL1 and the storage line STL. The second domain-dividing portion 252 may extend in the second intermediate direction in regions between the second gate line GL2 and the storage line STL. For example, the second domain-dividing portion 252 may have a V-shape, a W-shape, and the like. When viewed in the plan view, the second domain-dividing portion 252 may surround the first domain-dividing portion 182. In one embodiment, the second domain-dividing portion 252 may be surrounded by the first domain-dividing portion 182. The second domain-dividing portion 252 may include a plurality of notches for controlling the multiple domains of the liquid crystal molecules.

Although not shown in figures, the second substrate 200 may further include a second alignment layer formed on the common electrode layer CE and facing the first alignment layer. The first and second alignment layers may align the liquid crystal molecules between the first and second substrates 100 and 200.

The liquid crystal layer 300 is disposed between the first and second substrates 100 and 200. The liquid crystal layer 300 includes a liquid crystal composition including the liquid crystal molecules. When a refractive anisotropy (Δn) of the liquid crystal composition is less than about 0.1010, the light passing the liquid crystal layer 300 may be blocked by the liquid crystal molecules, thereby decreasing the light transmittance of the display panel 500. When the refractive anisotropy (Δn) of the liquid crystal composition is greater than about 0.1030, the light passing through the liquid crystal layer 300 may be barely refracted by the liquid crystal molecules. Thus, at a refractive anisotropy of greater than about 0.1030, the light transmittance may be difficult to control. Thus, the refractive anisotropy (Δn) of the liquid crystal composition may be about 0.1010 to about 0.1030.

A dielectric anisotropy (Δ∈) may preferably have a negative value if the liquid crystals are to be used in a VA mode. When an absolute value of the dielectric anisotropy (Δ∈) of the liquid crystal composition is less than about 2.9, the conductivity of the liquid crystal composition is low and the liquid crystal molecules may be hardly affected by a fringe field between the pixel electrode PE and the common electrode layer CE. Thus, it may be difficult to control the liquid crystal molecules. When an absolute value of the dielectric anisotropy (Δ∈) of the liquid crystal composition is greater than about 3.4, the conductivity of the liquid crystal composition is high and fine control of the liquid crystal molecules may be difficult. It is therefore desirable for the dielectric anisotropy (Δ∈) of the liquid crystal composition to be about −3.4 F/m to about −2.9 F/m.

The liquid crystal molecules of the liquid crystal composition may include a bicyclohexyl halogen phenyl compound being represented by the following Chemical Formula 1, a cyclohexyl halogen biphenyl compound being represented by the following Chemical Formula 2, a cyclohexyl halogen phenyl compound being represented by the following Chemical Formula 3, a bicyclohexyl compound being represented by the following Chemical Formula 4, a cyclohexyl phenyl compound being represented by the following Chemical Formula 5, a bicyclohexyl phenyl compound being represented by the following Chemical Formula 6, and a terphenyl cyclohexyl compound being represented by the following Chemical Formula 7.

<Chemical Formula 1>

<Chemical Formula 2>

<Chemical Formula 3>

<Chemical Formula 4>
<Chemical Formula 5>
<Chemical Formula 6>
<Chemical Formula 7>

In Chemical Formulas 1, 2, 3, 4, 5, 6, and 7, each of $R_1$, $R_3$, $R_7$, $R_8$, $R_9$, $R_{10}$, $R_{11}$, $R_{12}$, $R_{13}$ and $R_{14}$ represents an alkyl group having about 1 to about 5 carbon atoms. For example, each of $R_1$, $R_3$, $R_7$, $R_8$, $R_9$, $R_{10}$, $R_{11}$, $R_{12}$, $R_{13}$ and $R_{14}$ may represent a methyl group ($CH_3$—), ethyl group ($C_2H_5$—), a propyl group ($C_3H_7$—), a butyl group ($C_4H_9$—), or a pentyl group ($C_5H_{11}$—).

$R_5$ represents an alkenyl group having about 1 to about 5 carbon atoms. $R_5$ is a functional group including at least one carbon-carbon double bond. For example, $R_5$ may represent an ethenyl group ($C_2H_3$—), a propenyl group ($C_3H_5$—, $C_3H_3$—), a butenyl group ($C_4H_7$—, $C_4H_3$—), or a pentenyl group ($C_5H_9$—, $C_5H_7$—, $C_5H_5$—, $C_5H_3$—).

Each of $R_2$, $R_4$ and $R_6$ represents an alkoxyl group having about 1 to about 5 carbon atoms. For example, each of $R_2$, $R_4$ and $R_6$ may represent a methoxyl group ($CH_3O$—), an ethoxyl group ($C_2H_5O$—), a propoxyl group ($C_3H_7O$—), a butoxyl group ($C_4H_9$—O), or a pentoxyl group ($C_5H_{11}O$—).

Each of $X_1$, $X_2$, $X_3$, $X_4$, $X_5$, $X_6$, and $X_7$ represents a halogen. Exemplary halogens are fluorine or chlorine.

In the liquid crystal composition, the bicyclohexyl halogen phenyl compound, the cyclohexyl halogen biphenyl compound, and the cyclohexyl halogen phenyl compound are a polar portion of the liquid crystal composition. When the weight of the polar portion is less than about 49 percent by weight of the total weight of the liquid crystal composition, the liquid crystal composition may not be aligned in a substantially perpendicular direction with respect to a surface of the first substrate 100 although the fringe field is formed in the liquid crystal layer 300. When the weight of the polar portion is greater than about 58 percent by weight, it may be difficult to control the liquid crystal molecules using the fringe field. Thus, the polar portion may be about 49 percent by weight to about 58 percent by weight of the total weight of the liquid crystal composition.

In the liquid crystal composition, the bicyclohexyl compound, the cyclohexyl phenyl compound, the bicyclohexyl phenyl compound, and the terphenyl cyclohexyl compound are a neutral portion of the liquid crystal composition. The weight of the neutral portion may be about 42 percent by weight to about 51 percent by weight, when the weight of the polar portion is of about 49 percent by weight to about 58 percent by weight of the total weight of the liquid crystal composition.

In an embodiment, the liquid crystal composition may include about 4 percent by weight to about 7 percent by weight of the bicyclohexyl halogen phenyl compound, about 23 percent by weight to about 27 percent by weight of the cyclohexyl halogen biphenyl compound, about 22 percent by weight to about 24 percent by weight of the cyclohexyl halogen phenyl compound, about 24 percent by weight to about 26 percent by weight of the bicyclohexyl compound, about 6 percent by weight to about 11 percent by weight of the cyclohexyl phenyl compound, about 6 percent by weight to about 9 percent by weight of the bicyclohexyl phenyl compound, and about 4 percent by weight to about 6 percent by weight of the terphenyl cyclohexyl compound, based on the total weight of the liquid crystal composition.

Hereinafter, the first domain-dividing portion of the pixel electrode and the second domain-dividing portion of the common electrode layer will be described with reference to FIGS. 1, 2 and 3.

Figure 3:
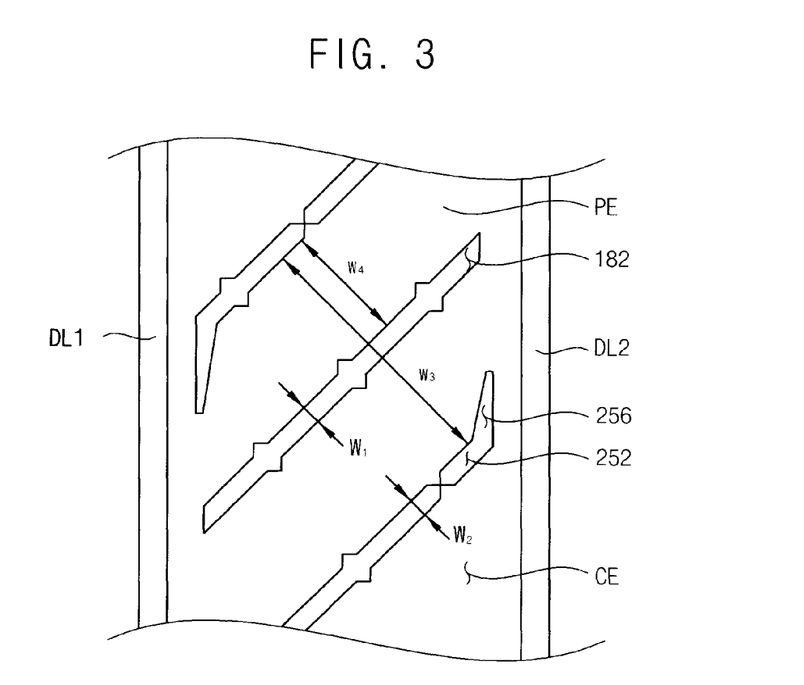
FIG. 3 is an exemplary enlarged plan view illustrating a first domain-dividing portion and a second domain-dividing portion in FIG. 1.

FIG. 3 is an exemplary enlarged plan view illustrating the first domain-dividing portion and the second domain-dividing portion in FIG. 1.

The second width ($w_2$) may become wider from a region that is proximate to a region where the first gate line GL1 crosses the second data line DL2 to a region that is proximate to the region where the first data line DL1 is formed. For example, the second width ($w_2$) of the second domain-dividing portion 252 adjacent or proximate to the region crossing the first gate line GL1 and the second data line DL2 may be about 8 μm, while the second width ($w_2$) of the second domain-dividing portion 252 adjacent or proximate to the region of the first data line DL1 may be about 10 μm. Thus, an area of the pixel electrode PE adjacent to an edge portion of the first domain-dividing portion 182 may be larger than that of the pixel electrode PE adjacent to an opposite edge portion of the first domain-dividing portion 182.

When a distance ($w_3$) between the second domain-dividing portions 252 adjacent to each other is less than about 49 μm, the first domain-dividing portion 182 and the second domain-dividing portion 252 are disposed excessively close to each other such that the liquid crystal molecules cannot be effectively controlled. When the distance ($w_3$) is greater than about 59 μm, the liquid crystal molecules adjacent to the second domain-dividing portion 252 may not be affected by the fringe field resulting in limited control over the liquid crystal molecules adjacent to the second domain-dividing portion 252. Thus, the distance ($w_3$) may be about 49 μm to about 59 μm.

In a plan view of the display panel 500, the distance ($w_4$ or $w_5$) between the first domain-dividing portion 182 and the second domain-dividing portion 252 adjacent to the first domain-dividing portion 182 may be about 21 μm to about 24.5 μm. The distance ($w_4$ or $w_5$) may be different in each region of the display panel 500.

Hereinafter, the first wing portion and the second wing portion of the common electrode layer will be described with reference to FIGS. 4A and 4B.

Figure 4A:
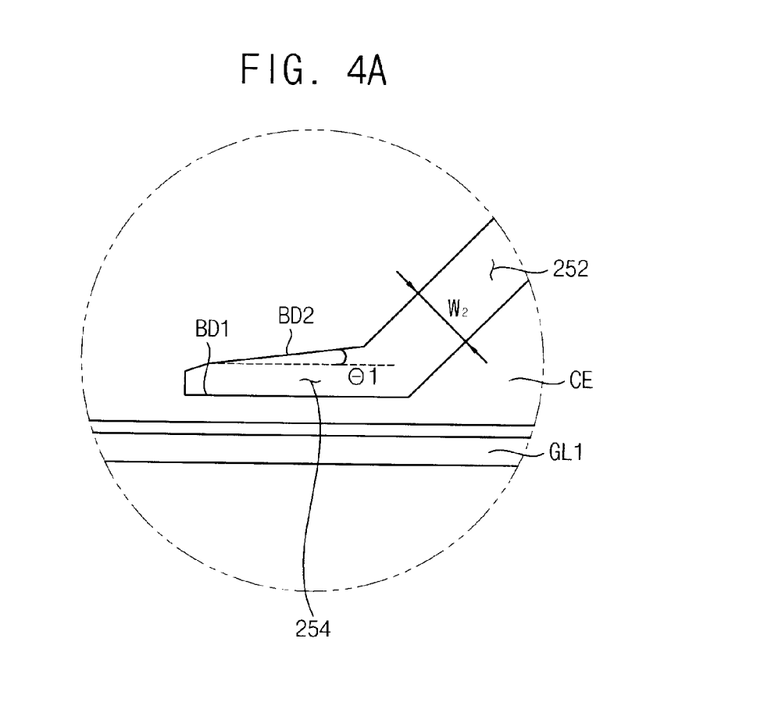
FIG. 4A is an exemplary enlarged plan view illustrating a first wing portion in FIG. 1.

FIG. 4A is an exemplary enlarged plan view illustrating a first wing portion in FIG. 1.

In particular, FIG. 4A is an enlarged plan view of a region "A" at an edge portion of the second domain-dividing portion 252 adjacent to the first gate line GL1 in FIG. 1.

Referring to FIG. 4A, the first wing portion 254 adjacent to the first gate line GL1 may be entirely disposed to be parallel with the first gate line GL1.

In particular, a first boundary BD1 close to the first gate line GL1 in the first wing portion 254 may extend in the first direction D1 to be substantially parallel with the first gate line GL1. A second boundary BD2 facing the first boundary BD1 in the first wing portion 254 may be slanted at a predetermined angle ($\theta_1$) with respect to the first gate line GL1. The angle between the second domain-dividing portion 252 and the first wing portion 254 may be varied. In one embodiment, the angle between the second domain-dividing portion 252 and the first wing portion 254 may be increased. Thus, a singular point, which is a point at which the directors of the liquid crystal molecules converge, may be removed or eliminated. It is generally desirable to minimize or eliminate the formation of singular points where it is difficult to exert proper control of the liquid crystalline molecules.

Thus, the liquid crystal molecules located at the connecting portion between the second domain-dividing portion 252 and the first wing portion 254 may be controlled, so as to minimize texture defects that prevent an image from being displayed. The inability to display an image is caused by a failure to control the liquid crystal molecules at the connecting portion. In addition, the formation of afterimages may be prevented by increasing the angle between the second domain-dividing portion 252 and the first wing portion 254. The angle between the second domain-dividing portion 252 and the first wing portion 254 may be greater than about 90 degrees and less than about 150 degrees.

At least one corner of the first wing portion 254 may be chamfered in order to eliminate the formation of another singular point in the first wing portion 254. Therefore, the singular point in the first wing portion 254 may be removed to prevent texture defects from being generated at an edge portion of the first wing portion 254.

Figure 4B:
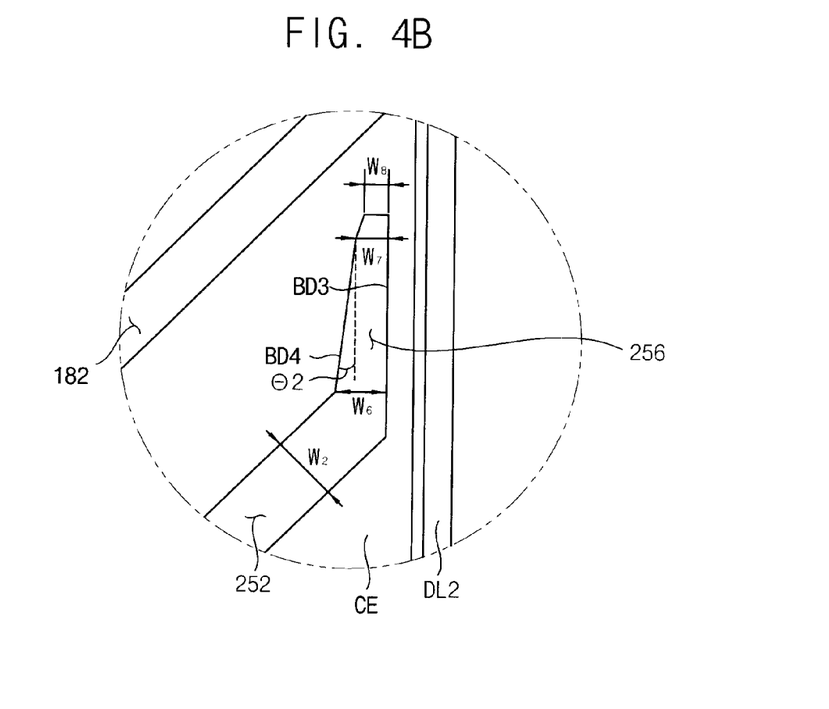
FIG. 4B is an exemplary enlarged plan view illustrating a second wing portion in FIG. 1.

FIG. 4B is an enlarged plan view illustrating a second wing portion in FIG. 1. The second wing portion is opposed to the first wing portion 254 of the second domain-dividing portion 252.

Referring to FIG. 4B, the second wing portions 256 is connected to the second domain-dividing portions 252. The second wing portion 256 is adjacent to the first data line DL1 and/or the second data line DL2 and may be entirely disposed in parallel with the first data line DL1 and/or the second data line DL2.

In particular, a third boundary BD3 close to the second data line DL2 in the second wing portion 256 may extend in the second direction D2 to be substantially parallel with the second data line DL2. A fourth boundary BD4 facing the third boundary BD3 in the second wing portion 256 may be slanted at a predetermined angle ($\theta_1$) with respect to the second data line DL2 varied. In one embodiment, the angle between the second domain-dividing portion 252 and the second wing portion 256 may be increased.

Increasing the angle between the second domain-dividing portion 252 and the second wing portion 256 results in the elimination of singular points. Thus, these singular points, which are points at which the directors of the liquid crystal molecules converge, may be removed. As noted above, the elimination of singular points results in better control of the liquid crystal molecules at the connecting portion between the second domain-dividing portion 252 and the second wing portion 256. The elimination or reduction of singular points results in the elimination of texture defects that prevent an image from being displayed. The inability to display an image is caused by failing to control the liquid crystal molecules at the connecting portion. In addition, the formation of afterimages may also be prevented. The angle between the second domain-dividing portion 252 and the second wing portion 256 may be greater than about 90 degrees and less than about 150 degrees.

As can be seen in the FIG. 4B, a distance ($w_6$) between the third and fourth boundaries BD3 and BD4 adjacent to the second domain-dividing portion 252 in the second wing portion 256 is larger than a distance ($w_7$) between the third and fourth boundaries BD3 and BD4 adjacent to the second wing portion 256, because the fourth boundary BD4 is slanted at a predetermined angle ($\theta_2$). The distance between the third and fourth boundaries BD3 and BD4 is reduced toward an edge portion of the second wing portion 256 from the second domain dividing portion 252. The distance ($w_6$) between the third and fourth boundaries BD3 and BD4 adjacent to the second domain-dividing portion 252 may be about 5 μm to about 10 μm. The distance ($w_7$) between the third and fourth boundaries BD3 and BD4 adjacent to the second wing portion 256 may be about 3 μm to about 6 μm.

At least one corner of the second wing portion 256 may be chamfered to prevent texture defects from being generated by singular points located at an edge portion of the second wing portion 256.

Hereinafter, a method for manufacturing the display panel shown in FIGS. 1 and 2 will be described with reference to FIG. 2.

Referring to FIG. 1 and the FIG. 2, the gate pattern including the first and second gate lines GL1 and GL2 and the gate electrode GE is formed on the first base substrate 110. The gate pattern may further include the storage line STL. A gate metal layer may be formed on the first base substrate 110 and patterned by a photolithography process to form the gate pattern. The gate metal layer may have a multilayer structure including a plurality of metal layers having physical characteristics different from each other or a single layer.

The gate insulation layer 130 is formed on the first base substrate 110 including the gate pattern.

The active pattern AP is formed on the first base substrate 110 including the gate insulation layer 130. The semiconductor layer 140a and the ohmic contact layer 140b may be formed on the first base substrate 110 including the gate insulation layer 130 and patterned by a photolithography process to form the active pattern AP.

The source pattern including the first and second data lines DL1 and DL2, the source electrode SE, and the drain electrode DE is formed on the first base substrate 110 including the active pattern AP. A source metal layer may be formed on the first base substrate 110 including the active pattern AP and patterned by a photolithography process to form the source pattern.

The passivation layer 160 and the organic layer 170 are sequentially formed on the base substrate including the source pattern. The passivation layer 160 and the organic layer 170 overlapping with the drain electrode DE are partially removed to form the contact hole CNT.

The pixel electrode PE is formed on the first base substrate 110 including the organic layer 170. A transparent electrode layer may be formed on the first base substrate 110 including the organic layer 170 and patterned by a photolithography process to form the pixel electrode PE. The transparent electrode layer may be formed using ITO, IZO, and the like.

Thus, the first substrate 100 shown in FIGS. 1, 2 and 3 is manufactured.

A metal layer may be formed on the second base substrate 210 and patterned by a photolithography process to form the light-blocking pattern 220. The metal layer may be formed using chrome. Alternatively, the light-blocking pattern 220 may be formed by jetting the organic material. In one embodiment, the light-blocking pattern 220 may be formed by ink-jetting the organic material.

The color filter 230 is formed on the second base substrate 210 including the light-blocking pattern 220. A color photoresist layer may be formed on the second base substrate 210, exposed to light and developed by a developing solution to form the color filter 230. Alternatively, the color filter 230 may be formed by jetting the color ink. In one embodiment, the color filter 230 may be formed by ink-jetting color ink.

The overcoating layer 240 is formed on the second base substrate 210 including the light-blocking pattern 220 and the color filter 230.

The common electrode layer CE is formed on the second base substrate 210 and may be disposed on the overcoating layer 240 as depicted in the FIG. 2. A transparent electrode layer may be formed on the second base substrate 210 including the overcoating layer 240 and patterned by a photolithography process to form the common electrode layer CE. The transparent electrode layer may be formed using ITO, IZO, and the like.

Thus, the second substrate 200 shown in FIGS. 1, 2, and 3 is manufactured.

A sealant (not shown) is coated along an edge of the first substrate 100. The liquid crystal composition may be dropped on an inner region of the first substrate 100. The liquid crystal composition is prevented from leaking out of the device by the sealant located at the boundaries of the first substrate 100. The first substrate 100 having the liquid crystal composition disposed thereon may be assembled with the second substrate 200 to manufacture the display panel 500.

Alternatively, the sealant may be coated along the edge of the first substrate 100 and assembled with the second substrate 200. The liquid crystal composition may be provided between the first and second substrates 100 and 200 to manufacture the display panel 500 after the first and second substrates 100 and 200 are assembled with each other.

According to an embodiment of the present invention, the aperture ratio and the light transmittance of the display panel having a low cell gap may be improved. In addition, texture defects in the first and second wing portions 254 and 256 may be prevented or reduced. Thus, the display quality of the display panel may be improved.

Figure 5:
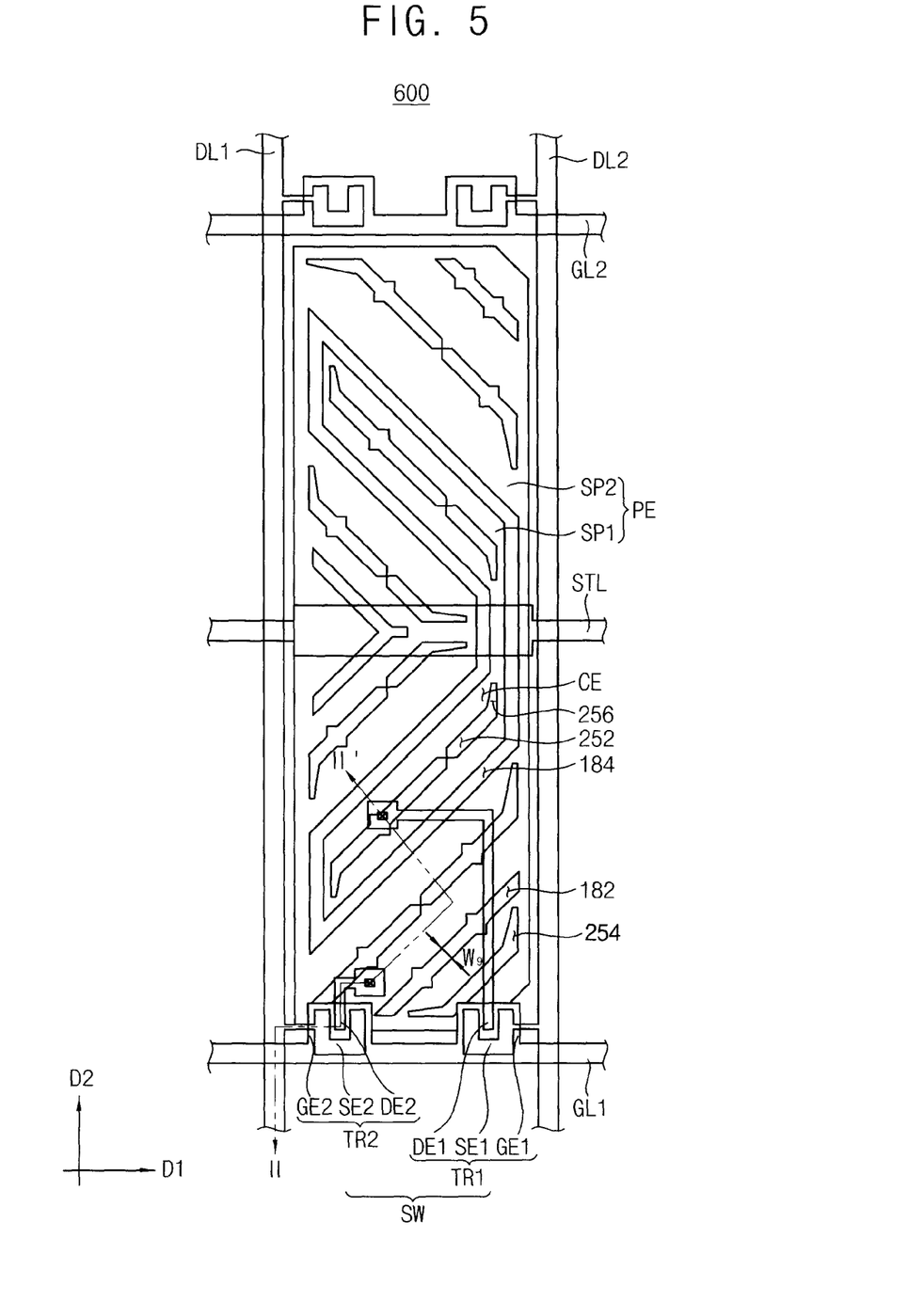
FIG. 5 is an exemplary plan view illustrating a display panel according to the present invention.
Figure 6:
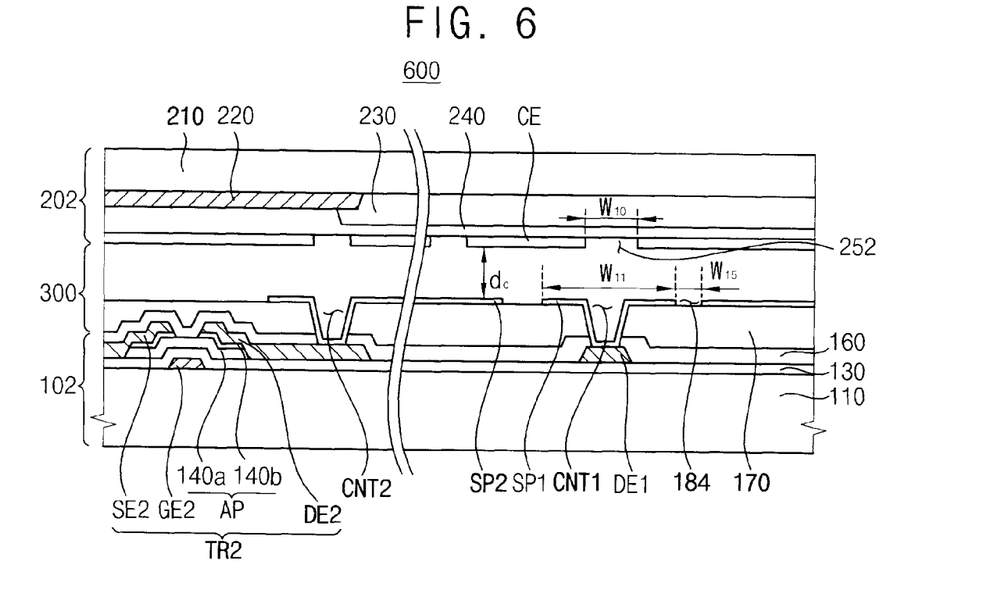
FIG. 6 is an exemplary cross-sectional view taken along a line II-II' in FIG. 5.

FIG. 5 is an exemplary plan view illustrating a display panel according to another embodiment of the present invention. FIG. 6 is an exemplary cross-sectional view taken along a line II-II'in FIG. 5.

A first substrate shown in FIGS. 5 and 6 is substantially the same as the first substrate shown in FIGS. 1 and 2, except for a first transistor, a second transistor, and a pixel electrode including a first sub-electrode and a second sub-electrode. In addition, the second substrate shown in FIGS. 5 and 6 is substantially the same as the second substrate shown in FIGS. 1 and 2, except for the number of second domain-dividing portions of the common electrode. Thus, any repetitive description will be omitted.

Referring to FIGS. 5 and 6, a display panel 600 includes a first substrate 102, a second substrate 202, and a liquid crystal layer 300 disposed between the first substrate 102 and the second substrate 202.

The first substrate 102 includes a plurality of signal lines, a switching element SW connected to the signal lines, and a pixel electrode PE electrically connected to the switching element SW.

The signal lines includes a first gate line GL1, a second gate line GL2, a first data line DL1, and a second data line DL2. The first data line DL1 receives a first voltage, and the second data line DL2 substantially arranged in parallel with the first data line DL1 receives a second voltage; the second voltage being different from the first voltage. The first voltage may be higher than the second voltage.

The switching element SW includes a first transistor TR1 for receiving the first voltage and a second transistor TR2 for receiving the second voltage. The first transistor TR1 is connected to the first gate line GL1 and the second data line DL1. The first transistor TR1 includes a first gate electrode GE1 connected to the first gate line GL1, a first source electrode SE1 connected to the second data line DL2, a first drain electrode DE1 spaced apart from the first source electrode SE1, and an active pattern AP. The second transistor TR2 is connected to the first gate line GL1 and the first data line DL1. The second transistor TR2 includes a second gate electrode GE2, a second source electrode SE2, a second drain electrode DE2, and an active pattern (not shown).

A passivation layer 160 and an organic layer 170 are formed on the first base substrate 110 including the first and second data lines DL1 and DL2, the first and second source electrodes SE1 and SE2, the first and second drain electrodes DE1 and DE2. The passivation layer 160 and the organic layer 170 may include a first contact hole CNT1 exposing a portion of the first drain electrode DE1 and a second contact hole CNT2 exposing a portion of the second drain electrode DE2.

The pixel electrode PE includes a first sub-electrode SP1 and a second sub-electrode SP2. The pixel electrode PE may be formed on the organic layer 170.

The first sub-electrode SP1 may make contact with the first drain electrode DE1 though the first contact hole CNT1 to be electrically connected to the first transistor TR1. The first sub-electrode SP1 may extend in a slanted direction with respect to a storage line STL and extend in a slanted direction towards the second gate line GL2. For example, the first sub-electrode SP1 may have a V-shape, a W-shape, and the like.

The second sub-electrode SP2 may make contact with the second drain electrode DE through the second contact hole CNT2 to be electrically connected to the second transistor TR2. The second sub-electrode SP2 may surround the first sub-electrode SP1. The second sub-electrode SP2 may include a first domain-dividing portion 182. The first domain-dividing portion 182 may extend in a slanted direction with respect to the first gate line GL1. A separation portion 184 between first sub-electrode SP1 and the second sub-electrode SP2 may serve as a domain-dividing portion for dividing the liquid crystal molecules of the liquid crystal layer 300 into a plurality of domains like the first domain-dividing portion 182. A third width ($w_9$) may be about 7.0 μm to about 9.0 μm. In an embodiment, the third width ($w_9$) may be about 8.0 μm. The first domain-dividing portion 182 may extend in a first intermediate direction between the first and second directions D1 and D2 in regions between the first gate line GL1 and the storage line STL. The first domain-dividing portion 182 may extend in a second intermediate direction different from the first intermediate direction in regions between the second gate line GL2 and the storage line STL. The second intermediate direction may be substantially perpendicular to the first intermediate direction. For example, the first domain-dividing portion 182 may have a V-shape, W-shape, and the like. The first domain-dividing portion may include a plurality of notches controlling the multiple domains of the liquid crystal molecules.

The second substrate 202 is spaced apart from the first substrate 102 to have a predetermined cell gap ($d_c$). The cell gap ($d_c$) may be about 3.1 μm to about 3.3 μm. In an embodiment, the cell gap ($d_c$) may be about 3.2 μm.

The second substrate 202 includes a common electrode layer CE. The common electrode layer CE includes a second domain-dividing portion 252. The second domain-dividing portion 252 may be formed on the second base substrate 210 and is formed in a region between the first domain-dividing portion 182 and the separation portion 184. The second domain-dividing portion 252 may be substantially disposed in parallel with the first domain-dividing portion 182 in a plan view. In a plan view, the second domain-dividing portion 252 may be formed on the second base substrate 210 corresponding to the first sub-electrode SP1 and the second sub-electrode SP2.

The common electrode layer CE may further include a first wing portion 254 and a second wing portion 256 each disposed at both edge portions of the second domain-dividing portion 252. Each of the first and second wing portions 254 and 256 may be substantially disposed in parallel with the first and second gate lines GL1 and GL2 or the first and second data lines DL1 and DL2. The first and second wing portions 254 and 256 may be substantially the same as the first and second wing portions shown in FIGS. 4A and 4B.

The liquid crystal layer 300 includes a liquid crystal composition including the liquid crystal molecules. The refractive anisotropy (Δn) of the liquid crystal composition may be about 0.1010 to about 0.1030. The dielectric anisotropy (Δ∈) of the liquid crystal composition may be about −3.4 F/m to about −2.9 F/m.

The liquid crystal molecules of the liquid crystal composition may include about 6 percent by weight of a bicyclohexyl halogen phenyl compound being represented by the following Chemical Formula 1, about 25 percent by weight of a cyclohexyl halogen biphenyl compound being represented by the following Chemical Formula 2, about 24 percent by weight of a cyclohexyl halogen phenyl compound being represented by the following Chemical Formula 3, about 25 percent by weight of a bicyclohexyl compound being represented by the following Chemical Formula 4, about 7 percent by weight of a cyclohexyl phenyl compound being represented by the following Chemical Formula 5, about 8 percent by weight of a bicyclohexyl phenyl compound being represented by the following Chemical Formula 6, and about 5 percent by weight of a terphenyl cyclohexyl compound being represented by the following Chemical Formula 7, based on the total weight of the liquid crystal composition.

<Chemical Formula 1>

<Chemical Formula 2>

<Chemical Formula 3>

<Chemical Formula 4>

<Chemical Formula 5>

<Chemical Formula 6>

<Chemical Formula 7>

In one embodiment, the refractive anisotropy (Δn) of the liquid crystal composition may be about 0.1010, and the dielectric anisotropy (Δ∈) of the liquid crystal composition may be about −3.4 F/m.

In another embodiment, the liquid crystal composition may include about 5 percent by weight of a bicyclohexyl halogen phenyl compound being represented by Chemical Formula 1, about 25 percent by weight of a cyclohexyl halogen biphenyl compound being represented by Chemical Formula 2, about 23 percent by weight of a cyclohexyl halogen phenyl compound being represented by Chemical Formula 3, about 25 percent by weight of a bicyclohexyl compound being represented by Chemical Formula 4, about 10 percent by weight of a cyclohexyl phenyl compound being represented by Chemical Formula 5, about 7 percent by weight of a bicyclohexyl phenyl compound being represented by Chemical Formula 6, and about 5 percent by weight of a terphenyl cyclohexyl compound being represented by Chemical Formula 7, based on the total weight of the liquid crystal composition. The refractive anisotropy (Δn) of the liquid crystal composition may be about 0.1030, and the dielectric anisotropy (Δ∈) of the liquid crystal composition may be about −2.9 F/m.

By using the liquid crystal composition in the display panel having the cell gap of about 3.1 μm to about 3.3 μm, the response time of the liquid crystal molecules may be improved. In particular, when the display panel displays the moving images, dragging of the moving images or afterimages may be prevented or reduced.

Figure 7:
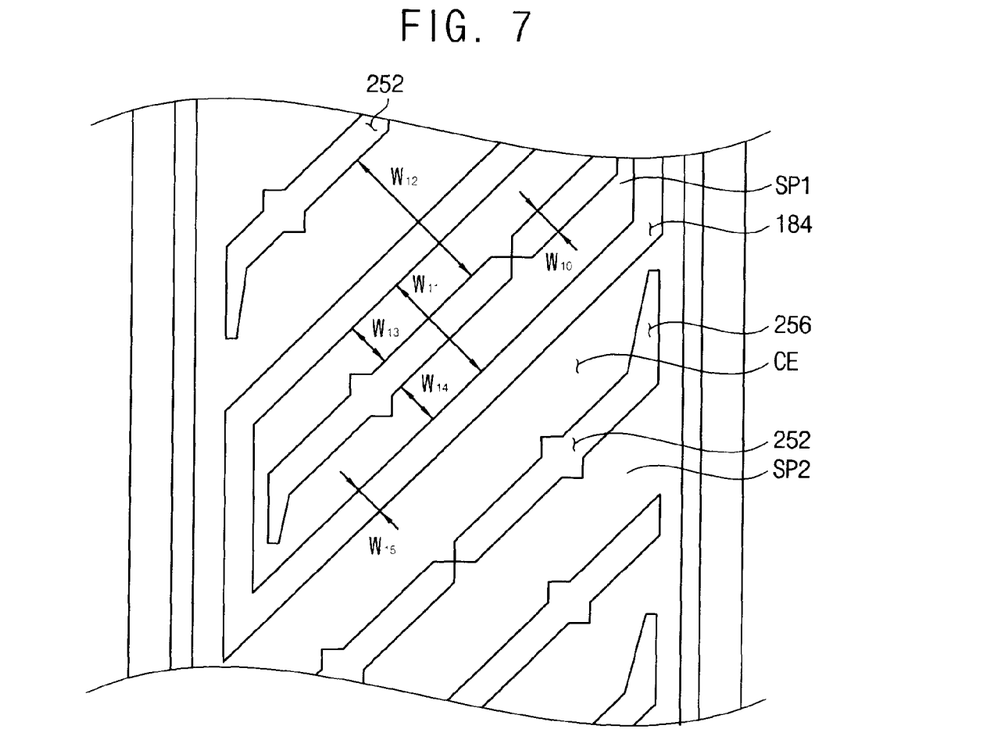
FIG. 7 is an exemplary enlarged plan view illustrating a first domain-dividing portion and a second domain-dividing portion in FIG. 5.

FIG. 7 is an enlarged plan view illustrating a first domain-dividing portion and a second domain-dividing portion in FIG. 5.

Referring to FIGS. 5, 6 and 7, a fourth width ($w_{10}$) may be of about 7 μm to about 9 μm an embodiment, the fourth width ($w_{10}$) may be about 8 μm.

When a width ($w_{11}$) of the first sub-electrode SP1 is less than about 49 μm, the second domain-dividing portion 252 disposed on the second sub-electrode SP2 and the separation portion 184 are disposed excessively close to each other. As a result, it is difficult to control the liquid crystal molecules. When a width ($w_{11}$) of the second sub-electrode SP2 is greater than about 59 μm, the liquid crystal molecules adjacent to the separation portion 184 may not be substantially affected by the fringe field so that it may be difficult to control the liquid crystal molecules adjacent to separation portion 184. Thus, the width ($w_{11}$) may be about 49 μm to about 59 μm.

When a distance ($w_{12}$) between the second domain-dividing portions 252 adjacent to each other is less than about 46.5

μm, the first domain-dividing portion 182 and the second domain-dividing portion 252 are disposed excessively close to each other so that the liquid crystal molecules may be hardly controlled. When the distance ($w_{12}$) is greater than about 55.5 μm, the liquid crystal molecules adjacent to the second domain-dividing portion 252 may not be affected by the fringe field so that it may be difficult to control the liquid crystal molecules adjacent to the second domain-dividing portion 252. Thus, the distance ($w_{12}$) may be about 46.5 μm to about 55.5 μm.

In a plan view of the display panel 600, a distance ($w_{13}$ or $w_{14}$) between the separation portion 184 and the second domain-dividing portion 252 adjacent to the separation portion 184 may be about 21 μm to about 24.5 μm. The distance ($w_{13}$ or $w_{14}$) may be different in each region of the display panel 600.

When a width ($w_{15}$) between the first sub-electrode SP1 and the second sub-electrode SP2 is less than about 4.5 μm, it is difficult to control the liquid crystal molecules because the first voltage is different from the second voltage, thereby causing an interference between the fringe field formed by the first voltage and the fringe field formed by the second voltage. When the width ($w_{15}$) is greater than about 6.5 μm, the aperture ratio of the display panel 600 may be decreased. Thus, the width ($w_{15}$) of the separation portion 184 may be about 4.5 μm to 6.5 μm.

The fourth width ($w_{10}$) of the second domain-dividing portion 252 may become larger as the second domain-dividing portion 252 is closer to a region forming the first data line DL1 from a region that is closer to a region where the first gate line GL1 and the second data line DL2 cross one another. For example, the fourth width ($w_{10}$) of the second domain-dividing portion 252 adjacent to the region crossing the first gate line GL1 and the second data line DL2 may be about 8 μm, while the fourth width ($w_{10}$) of the second domain-dividing portion 252 adjacent to the first data line DL1 may be about 10 μm, because an area of the first sub-electrode SP1 disposed at an edge portion of the separation portion 184 may be larger than that of the second sub-electrode SP2 disposed at an opposite edge portion of the separation portion 184 with respect to the separation portion 184.

When a display panel has about 3.55 μm of a cell gap, about 10 μm of a width of the first domain-dividing portion, about 10 μm of a width of the second domain-dividing portion, about 8.1 μm of a distance between the first and second sub-electrodes, and about 24.5 μm of a distance between the first and second domain-dividing portions in a plan view, the aperture ratio may be defined to be about 100%. When the aperture ratio of the display panel is defined as about 100%, and when a display panel has a cell gap of about 3.1 μm to about 3.3 μm, about 7.0 μm to about 9.0 μm of a width of the first domain-dividing portion, about 7.0 μm to about 9.0 μm of a width of the second domain-dividing portion, about 4.5 μm to about 6.5 μm of a distance between the first and second sub-electrodes, and about 24 μm to about 24.5 μm of a distance between the first and second domain-dividing portions in a plan view, the aperture ratio may be about 107.5% to about 110%. The above description may be applied to a display panel having any area, such as, for example, a display panel of about 40 inches, a display panel of about 46 inches, or a display panel of about 52 inches to improve the aperture ratio and the light transmittance.

Although not shown in figures, the first and second wing portions according to another embodiment are substantially the same as the first and second wing portions shown in FIGS. 5A and 5B. Thus, any repetitive description will be omitted.

In one embodiment, the aperture ratio and the light transmittance of the display panel having a low cell gap may be improved. In addition, texture defects in a peripheral region of the second wing portion 256 may be prevented or reduced. Thus, the display quality of the display panel may be improved.

According to the present invention, the aperture ratio and the light transmittance of a display panel having a low cell gap may be improved. In addition, texture defects may be prevented or reduced. Thus, the display quality of the display panel may be improved.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:
1. A display panel comprising:
   a first substrate including a switching element connected to a gate line and a data line; and a pixel electrode electrically connected to the switching element, the pixel electrode including a first domain-dividing portion extending in a direction; the gate line and the data line crossing each other;
   a second substrate spaced apart from the first substrate to have a cell gap of about 3.1 micrometers to about 3.3 micrometers, the second substrate including a common electrode including a second domain dividing portion formed in a region between the first domain-dividing portions adjacent to each other and not overlapping the first domain-dividing portions; and
   a liquid crystal layer interposed between the first and second substrates, the liquid crystal layer including a liquid crystal composition having a refractive anisotropy (An) of about 0.1010 to about 0.1030.

2. The display panel of claim 1, wherein at least one of the first and second domain-dividing portions have a width of about 7.0 micrometers to about 9.0 micrometers.

3. The display panel of claim 1, wherein the common electrode further comprises a first wing portion, which is an opening, formed by removing a portion of the common electrode, the first wing portion adjacent to the gate line, and
   a first boundary of the first wing portion adjacent to the gate line is parallel with the gate line, and a second boundary of the first wing portion opposite to the first boundary is slanted with respect to the gate line.

4. The display panel of claim 3, wherein at least one corner of the first wing portion is chamfered.

5. The display panel of claim 1, wherein a gap between the first domain-dividing portion and the second domain-diving portion adjacent to the first domain-dividing portion is about 21 micrometers to about 24.5 micrometers.

6. The display panel of claim 1, wherein the pixel electrode comprises a first sub-electrode receiving a first voltage and a second sub-electrode receiving a second voltage; the second voltage being different from the first voltage; the second sub-electrode spaced apart from the first sub-electrode and including the first domain-dividing portion, and the switching element comprises a first transistor electrically connected to the first sub-electrode and a second transistor electrically connected to the second sub-electrode.

7. The display panel of claim 6, wherein a gap between the first sub-electrode and the second sub-electrode is about 4.5 micrometers to about 6.5 micrometers.

8. The display panel of claim 6, wherein the second domain-dividing portion corresponding to the first sub-electrode has a width of about 8 micrometers to about 10 micrometers, and the second domain-dividing portion corresponding to the second sub-electrode has a width of about 7 micrometers to about 8 micrometers.

9. The display panel of claim 1, wherein a dielectric anisotropy (Δ∈) of the liquid crystal composition is about −3.4 farads per meter to about −2.9 farads per meter.

10. The display panel of claim 1, wherein the liquid crystal composition comprises:

a bicyclohexyl halogen phenyl compound being represented by the following Chemical Formula 1;

a cyclohexyl halogen biphenyl compound being represented by the following Chemical Formula 2;

a cyclohexyl halogen phenyl compound being represented by the following Chemical Formula 3;

a bicyclohexyl compound being represented by the following Chemical Formula 4;

a cyclohexyl phenyl compound being represented by the following Chemical Formula 5;

a bicyclohexyl phenyl compound being represented by the following Chemical Formula 6; and a terphenyl cyclohexyl compound being represented by the following Chemical Formula 7, <Chemical Formula 1>

<Chemical Formula 2>

<Chemical Formula 3>

<Chemical Formula 4>

<Chemical Formula 5>

<Chemical Formula 6>

<Chemical Formula 7> wherein, in Chemical Formulas 1 to 7, each of $R_1$, $R_3$, $R_7$, $R_8$, $R_9$, $R_{10}$, $R_{11}$, $R_{12}$, $R_{13}$ and $R_{14}$ represents an alkyl group having about 1 to about 5 carbon atoms, $R_5$ represents an alkenyl group having about 1 to about 5 carbon atoms, each of $R_2$, $R_4$ and $R_6$ represents an alkoxyl group having about 1 to about 5 carbon atoms, and each of $X_1$, $X_2$, $X_3$, $X_4$, $X_5$, $X_6$, and $X_7$ represents fluorine or chlorine.

11. The display panel of claim 10, wherein the liquid crystal composition comprises:

about 4 percent by weight to about 7 percent by weight of the bicyclohexyl halogen phenyl compound;

about 23 percent by weight to about 27 percent by weight of the cyclohexyl halogen biphenyl compound;

about 22 percent by weight to about 24 percent by weight of the cyclohexyl halogen phenyl compound;

about 24 percent by weight to about 26 percent by weight of the bicyclohexyl compound;

about 6 percent by weight to about 11 percent by weight of the cyclohexyl phenyl compound;

about 6 percent by weight to about 9 percent by weight of the bicyclohexyl phenyl compound; and about 4 percent by weight to about 6 percent by weight of the terphenyl cyclohexyl compound, wherein the weight percents are based on the total weight of the liquid crystal composition.

12. A display panel comprising:

a first substrate including a switching element connected to a gate line and a data line; and a pixel electrode electrically connected to the switching element, the pixel electrode including a first domain-dividing portion having a width of about 7.0 micrometers to about 9.0 micrometers, the first domain-dividing portion extending in a slanted direction with respect to the gate line; the gate line and the data line crossing each other;

a second substrate spaced apart from the first substrate to have a cell gap of about 3.1 micrometers to about 3.3 micrometers, the second substrate including a common electrode including a second domain dividing portion formed in a region between the first domain-dividing portions adjacent to each other and not overlapping the first domain-dividing portions; and a liquid crystal layer interposed between the first and second substrates.

13. The display panel of claim 12, wherein the second domain-dividing portion has a width of about 7.0 micrometers to about 9.0 micrometers.

14. The display panel of claim 12, wherein the common electrode further comprises a first wing portion, which is an opening, formed by removing a portion of the common electrode, the first wing portion adjacent to the gate line, and a first boundary of the first wing portion adjacent to the gate line is parallel with the gate line, and a second boundary of the first wing portion opposite to the first boundary is slanted with respect to the gate line.

15. The display panel of claim 14, wherein the common electrode further comprises a second wing portion, which is an opening, formed by removing a portion of the common electrode, the second wing portion being adjacent to the gate line; and a third boundary of the second wing portion adjacent to the gate line is parallel with the data line, and a fourth boundary of the second wing portion opposite to the third boundary is slanted with respect to the data line.

16. The display panel of claim 15, wherein a distance between the third boundary adjacent to the second domain-dividing portion and the fourth boundary is about 5 micrometers to about 10 micrometers, the distance becomes narrow from the second domain-dividing portion to the second wing portion, and a distance between the third boundary adjacent to the second wing portion and the fourth boundary is about 3 micrometers to about 6 micrometers.

17. The display panel of claim 12, wherein, a gap between the first domain-dividing portion and the second domain-dividing portion adjacent to the first domain-dividing portion is about 21 micrometers to about 24.5 micrometers.

18. The display panel of claim 12, wherein the pixel electrode comprises a first sub-electrode receiving a first voltage and a second sub-electrode receiving a second voltage; the second voltage being different from the first voltage, the second sub-electrode spaced apart from the first sub-electrode and including the first domain-dividing portion, and the switching element comprises a first transistor electrically connected to the first sub-electrode and a second transistor electrically connected to the second sub-electrode.

19. The display panel of claim 18, wherein a gap between the first and second sub-electrodes is about 4.5 micrometers to about 6.5 micrometers.

20. The display panel of claim 18, wherein the second domain-dividing portion corresponding to the first sub-electrode has a width of about 8 micrometers to about 10 micrometers, and the second domain-dividing portion corresponding to the second sub-electrode has a width of about 7 micrometers to about 8 micrometers.

* * * * *